United States Patent [19]
Onan et al.

[11] Patent Number: 5,332,041
[45] Date of Patent: Jul. 26, 1994

[54] SET-ACTIVATED CEMENTITIOUS COMPOSITIONS AND METHODS

[75] Inventors: David D. Onan, Lawton; Dralen T. Terry, Duncan; Wendell D. Riley, Marlow, all of Okla.

[73] Assignee: Halliburton Company, Duncan, Okla.

[21] Appl. No.: 998,276

[22] Filed: Dec. 30, 1992

[51] Int. Cl.⁵ .................................... E21B 33/14
[52] U.S. Cl. ........................... 166/295; 106/789
[58] Field of Search ............ 166/292, 293, 294, 295; 106/789, 790

[56] References Cited

U.S. PATENT DOCUMENTS

| | | | |
|---|---|---|---|
| 2,646,360 | 7/1953 | Lea | 106/90 |
| 4,328,036 | 5/1982 | Nelson et al. | 106/85 |
| 4,384,896 | 5/1983 | Aitcin et al. | 106/288 B |
| 4,410,366 | 10/1983 | Birchall et al. | 106/90 |
| 4,775,505 | 10/1988 | Kuroda et al. | 264/82 |
| 4,781,760 | 11/1988 | Svensson et al. | 106/89 |
| 4,818,288 | 4/1989 | Aignesberger et al. | 106/90 |
| 4,933,013 | 6/1990 | Sakai et al. | 106/85 |
| 5,016,711 | 5/1991 | Cowan | 166/250 |
| 5,020,598 | 6/1991 | Cowan et al. | 166/293 |
| 5,026,215 | 6/1991 | Clarke | 166/293 X |
| 5,086,850 | 2/1992 | Harris et al. | 175/61 |
| 5,106,423 | 4/1992 | Clarke | 166/293 X |

Primary Examiner—William P. Neuder
Attorney, Agent, or Firm—Robert A. Kent; Thomas R. Weaver; C. Clark Dougherty, Jr.

[57] ABSTRACT

Set-activated cementitious compositions and methods of using such compositions in cementing subterranean zones penetrated by well bores are provided. The compositions are basically comprised of water, particulate condensed silica fume suspended in the water; a dispersing agent for facilitating the dispersal of the silica fume particles in the water and maintaining the particles in suspension therein, a set-activator and a set delaying additive for increasing the time in which the composition sets after the set-activator is combined therewith.

12 Claims, 1 Drawing Sheet

SET-ACTIVATED CEMENTITIOUS COMPOSITIONS AND METHODS

BACKGROUND OF THE INVENTION

1. Field of the Invention

The present invention relates to set activated aqueous cementitious compositions comprised of ultra fine particle size condensed silica fume and methods of using such compositions for well cementing.

2. Description of the Prior Art

Heretofore, hydraulic cement compositions have been utilized for carrying out a variety of cementing operations in oil, gas and water wells. Such compositions have typically included a particulate hydraulic cement such as Portland cement, water, and other additives such as dispersing agents, fluid loss control additives, set retarding additives, anti-strength retrogression additives and the like.

While such hydraulic cement compositions have been utilized successfully in carrying out a variety of well cementing operations, certain inherent problems and disadvantages are encountered in their use. For example, the particulate hydraulic cement must be mixed with the water utilized at the job site in that after mixing, the hydration reaction which results in the thickening and setting of the mixture quickly begins. This requires the presence of particulate solid and liquid mixing equipment at the job site and the use of the resulting cement composition within a relatively short period of time after mixing. In addition, while very fine particle size hydraulic cement has been used heretofore, aqueous slurries of such cement particles have still been unable to penetrate some very low permeability formations. Also, hydraulic cement slurries often have less than the desired thixotropic, flow, solid-suspension, corrosion resistance, low fluid loss and/or anti-strength retrogression properties without the addition of cost increasing additives thereto.

Thus, there is a need for set-activated cementitious compositions which can be utilized for carrying out well cementing operations which are relatively inexpensive, contain suspended particulate solids of extremely fine particle size, are comprised of premixed liquid components which can be stored at the job site until needed and then readily and easily mixed, have properties suitable for use over a wide range of well conditions, have excellent thixotropic, flow, solid-suspension, anti-strength retrogression, corrosion resistance and low fluid loss properties and contain little or no water soluble free lime.

SUMMARY OF THE INVENTION

The present invention provides set-activated cementitious compositions and methods which meet the needs described above and overcome the shortcomings of the prior art. The set-activated cementitious compositions are pumpable aqueous slurries of very fine particulate solids comprised of water, particulate condensed silica fume having a particle size of less than about 1 micrometer in diameter suspended in the water in a weight ratio of condensed silica fume to water in the range of from about 1:2 to about 1.5:1, a dispersing agent for facilitating the dispersal of the silica fume particles in the water and maintaining the particles in suspension therein, a set-activator selected from calcium hydroxide, magnesium oxide or mixtures thereof, and a set delaying additive for increasing the time in which the composition sets after the set-activator is combined therewith.

A preferred dispersing agent is comprised of the condensation polymer product of an aliphatic ketone, an aliphatic aldehyde and a compound which introduces acid groups into the condensation polymer, and a preferred set delaying agent is comprised of a lignosulfonate salt. The set activator, preferably calcium hydroxide, is generally present in the cementitious composition in an amount whereby the weight ratio of condensed silica fume to calcium hydroxide is in the range of from about 1:1.5 to about 3:1.

The methods of this invention basically comprise the steps of forming a pumpable cementitious composition of the invention, pumping the composition into a subterranean zone by way of a well bore penetrating the zone and allowing the cementitious composition to set in the zone. The step of forming the pumpable cementitious composition preferably comprises mixing a preformed concentrated aqueous slurry of the particulate condensed silica fume with additional water and with preformed aqueous solutions of dispersing agent and set delaying additive to thereby forming a pumpable non-activated cementitious slurry. Just prior to or as the non-activated cementitious slurry is pumped into the well bore and the zone to be cemented, an aqueous solution of the set activator is combined therewith.

It is, therefore, a general object of the present invention to provide set-activated cementitious compositions and methods of using such compositions for performing well cementing operations.

Other and further objects, features and advantages of the present invention will be readily apparent from the description of preferred embodiments which follows.

DESCRIPTION OF PREFERRED EMBODIMENTS

Figure 1:
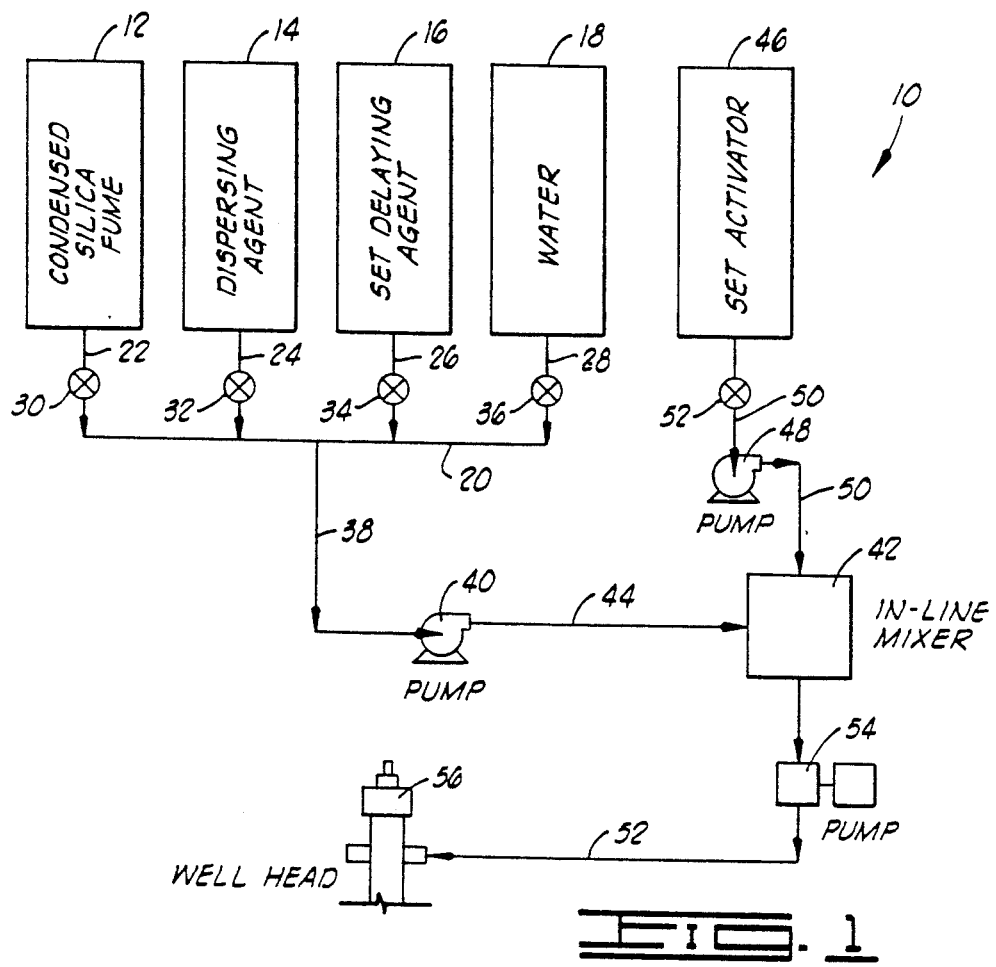
FIG. 1 is a schematic illustration of a system of apparatus for forming a set-activated cementitious composition of this invention on-the-fly.

The set-activated cementitious compositions of this invention are basically comprised of water, particulate condensed silica fume, a dispersing agent for facilitating the dispersal of the silica fume particles in the water and maintaining the particles in suspension therein, a set-activator selected from calcium hydroxide, magnesium oxide or mixtures thereof and a set delaying additive for increasing the time in which the compositions set after the set-activator is combined therewith. As mentioned above, the set-activated cementitious compositions can be formed of premixed liquid ingredients which can readily and easily be mixed to tailor the compositions to a wide range of well conditions. The compositions have excellent flow and solids suspension properties, thixotropy, little or no soluble free lime, anti-strength retrogression, corrosion resistance and low fluid loss properties. Due to the ultra fine particle size of the condensed silica fume, i.e., an average particle diameter of about 0.1 micrometers, the compositions have the ability to penetrate very low permeability subterranean well formations, i.e., formations having permeabilities ranging from about 1 to about 10 millidarcies.

Condensed silica fume, also known as amorphous silica, silica dust or volitized silica is commercially available as an ultra fine powder consisting of submicron size spheres having an average diameter of about 0.1 micrometer. Condensed silica fume is a by-product material produced in the manufacture of silicon and ferrosilicon. Silicon and ferrosilicon are obtained by subjecting quartz (when silicon is produced) or quartz and an iron bearing material (when ferrosilicon is produced) to reduction with coke or coal and wood chips in an open electric arc furnace. The reduction reaction involves an intermediate reaction wherein a gaseous suboxide of silicon is formed and part of the gaseous suboxide of silicon escapes into the atmosphere. The gaseous suboxide of silicon reacts with oxygen in the atmosphere and condenses to form glassy microscopic particles known as condensed silica fume.

The condensed silica fume is recovered by filtration and is characterized by having a very fine particle size, i.e., the particles have diameters less than about 1 micrometer and are of an average diameter of about 0.1 micrometer. The average size of condensed silica fume particles is about 100 times smaller than that of API Portland cement and about 10 times smaller than very fine cements such as those described in U.S. Pat. No. 4,761,183 to Clark and U.S. Pat. No. 4,160,674 to Sawyer. The specific surface area of condensed silica fume particles is about 20,000 square meters per kilogram, and the condensed silica fume generally contains more than about 90% amorphous silicon dioxide. The specific chemical composition of condensed silica fume varies in accordance with the particular silicon product produced.

The condensed silica fume can be obtained commercially in a dry powder form or in a relatively concentrated aqueous slurry form. When obtained in a slurry form, the slurry generally has a weight ratio of condensed silica fume to water in the range of from about 2:3 to about 3:2.

In whatever form the condensed silica fume is obtained, it is combined with water or additional water to form a slurry having a weight ratio of condensed silica fume to water in the range of from about 1:2 to about 1.5:1, and a dispersing agent is combined with the water to facilitate the dispersal of the silica fume particles in the water and maintain the particles in suspension therein. While various dispersing agents can be used, a particularly suitable dispersing agent is comprised of the condensed polymer product of an aliphatic ketone, an aliphatic aldehyde and a compound which introduces acid groups into the condensation polymer. Such a dispersing agent is disclosed in U.S. Pat. No. 4,818,288 issued Apr. 4, 1989 to Aignesberger et al., which is incorporated herein by reference.

The most preferred such dispersing agent for use in accordance with this invention is comprised of the condensation polymer product of acetone, formaldehyde and sodium sulfite. The dispersing agent is generally included in the cementitious composition in an amount in the range of from about 1% to about 5% by weight of solids, or the equivalent amount of about 2% to about 7% by weight of water, in the composition. Generally, the above described dispersing agent is commercially available in an aqueous solution containing the dispersing agent in an amount in the range of from about 30% to about 35% by weight of the solution.

The set delaying additive for increasing the time in which the cementitious composition of this invention sets after the set-activator is combined therewith can be any of various set delaying additives heretofore utilized in cement compositions, e.g., the copolymer of AMPS® (2-acrylamido-2-methyl propane sulfonic acid) and acrylic acid, tartaric acid or calcium or ammonium lignosulfonate salts. Preferably the set delaying additive is a lignosulfonate salt, most preferably calcium lignosulfonate, present in the cementitious composition in an amount in the range of from about 0.1% to about 2% by weight of the composition. Such a lignosulfonate salt can be obtained commercially in an aqueous solution containing the lignosulfonate salt in an amount in the range of from about 40% to about 60% by weight of the solution.

The set-activator, preferably calcium hydroxide, is generally present in the cementitious composition of this invention in an amount whereby the weight ratio of condensed silica fume to calcium hydroxide is in the range of from about 1:1.5 to about 3:1.

In forming the set-activated cementitious composition of this invention and utilizing it for carrying out well cementing operations, a non-activated cementitious slurry is preferably first prepared by mixing the water, condensed silica fume, dispersing agent and set delaying additive. Then, just prior to introducing the cementitious composition into a subterranean zone to be cemented by way of a well bore penetrating the zone, the set-activator component is combined with the non-activated cementitious slurry to form the set-activated cementitious composition.

As will be understood by those skilled in the art, the non-activated cementitious slurry can be preformed by mixing the various components at a location remote from the well site, or the components can be mixed at the well site just prior to the use of the set-activated cementitious composition. In cementing operations carried out at offshore well locations, the non-activated slurry is preferably preformed on land and then mixed with the calcium hydroxide activator at the job site just prior to use. When the location of the well site is on land, it is generally most convenient and economical to mix the components of the non-activated cementitious slurry at the well site and then mix the non-activated cementitious slurry with the set activator just prior to introducing the resulting set-activated cementitious composition into the well bore, etc.

When the non-activated cementitious slurry is formed at the well site, it can be preformed and stored until use or it can be mixed on-the-fly. The set activator can also be mixed with the non-activated cementitious slurry on-the-fly as the resulting set-activated cementitious composition is pumped into a subterranean zone to be cemented by way of a well bore penetrating the zone. The term "on-the-fly" is used herein to mean that the components of the cementitious composition are mixed as they are being pumped from reservoirs and the resulting set-activated cementitious composition is pumped into a well bore.

A system of apparatus for forming a set-activated cementitious slurry on-the-fly is illustrated schematically in FIG. 1 and generally designated by the numeral 10. The system 10 is utilized in applications where the non-activated cementitious slurry is formed on site and is combined with the set-activator on-the-fly as the resulting set-activated cementitious composition is pumped into a subterranean zone to be cemented.

As shown in FIG. 1, the system 10 is comprised of four holding tanks 12, 14, 16 and 18 for containing the components of the non-activated cementitious slurry of this invention in liquid form. That is, the holding tank 12 contains a reservoir of a concentrated aqueous slurry of condensed silica fume, the holding tank 14 contains a reservoir of dispersing agent solution, the holding tank 16 contains a reservoir of set delaying agent solution and the holding tank 18 contains a reservoir of water. The tanks 12, 14, 16 and 18 are connected to a header 20 by conduits 22, 24, 26 and 28, respectively. Conventional flow rate metering valve assemblies 30, 32, 34 and 36 are disposed in the conduits 22, 24, 26 and 28 respectively, and a conduit 38 is connected between the header 20 and the section connection of a pump 40. The flow rate metering valve assemblies 30, 32, 34 and 36 function to control the flow rates of the various components at predetermined ratios to each other whereby the resulting mixture pumped by the pump 40 is of the desired component composition.

A holding tank 46 is provided for containing a reservoir of an aqueous solution of calcium hydroxide set activator, and the holding tank 46 is connected to the suction connection of a pump 48 by a conduit 50. A flow rate metering valve assembly 52 is disposed in the conduit 50 which functions to proportion the flow rate of the activator pumped by the pump 48 to the flow rate of the non-activated cementitious slurry pumped by the pump 40. The discharge connections of the pumps 40 and 48 are connected to the in-line mixer 42 by conduits 44 and 50, respectively. The in-line mixer 42 is connected by a conduit 52 to the well head of the well to be cemented, and a slurry pump 54 is disposed in the conduit 52. As will be understood, the holding tanks, pumps and other apparatus of the system 10 are normally truck mounted so that they can readily be moved to a well site and used for performing a cementing operation and then removed.

In operation of the system 10, the four components for forming a non-activated cementitious slurry, i.e., liquid suspensions or solutions of condensed silica fume, dispersing agent and set delaying agent and additional water are contained in the holding tanks 12, 14, 16 and 18 respectively. A liquid solution of the calcium hydroxide set-activator is contained in the holding tank 46. The pumps 40, 48 and 54 are simultaneously started and the flow rate metering valve assemblies 30, 32, 34, 36 and 52 meter predetermined flow rates of the concentrated aqueous condensed silica fume slurry, the aqueous solution of dispersing agent, the aqueous solution of the set delaying agent and the additional water into the header 20 by way of the conduits 22, 24, 26 and 28 connected thereto. The four components are mixed as they flow into the header 20, through the conduit 38 and to the pump 40. The pump 40 further mixes the components making up the non-activated cementitious composition and pumps it into the in-line mixer 42. Simultaneously, a predetermined flow rate of the aqueous set-activator solution flows through the conduit 50 and metering valve system 52 therein to the suction of the pump 48. The set-activator solution is pumped by way of the conduit 50 into the in-line mixture 42 wherein it is intimately mixed with the non-activated cementitious composition entering the in-line mixer 42 by way of the conduit 44 in a predetermined ratio thereto. The resulting set-activated cementitious composition of this invention is pumped by way of the slurry pump 54 and conduit 52 into the well head 56 and into the zone to be cemented by way of the well bore to which the well head 56 is sealingly connected.

Figure 2:
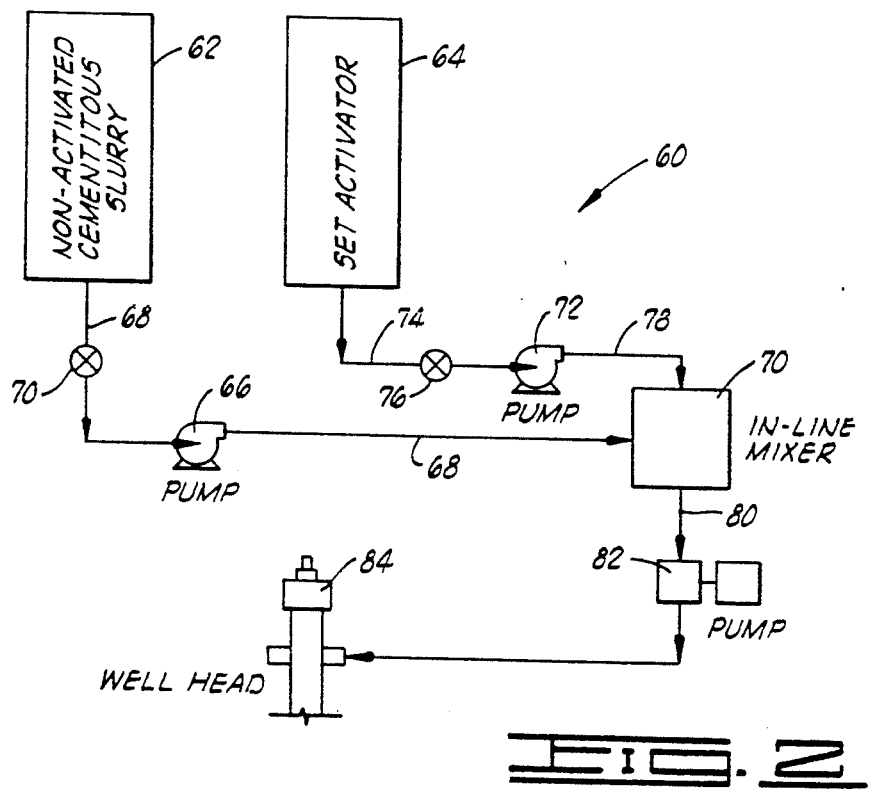
FIG. 2 is a schematic illustration of an alternate system of apparatus for forming a set-activated cementitious composition of this invention.

Referring now to FIG. 2, an alternate system, generally designated by the numeral 60, is schematically illustrated. The system 60 is utilized in cementing applications involving offshore wells and other applications where it is desirable to preform the non-activated cementitious slurry. That is, the non-activated cementitious slurry is preformed at a location remote from the well site by mixing the condensed silica fume, dispersing agent, set delaying agent and water. The resulting non-activated cementitious slurry is transported to the well site in a holding tank 62. The set activator, i.e., an aqueous solution of calcium hydroxide, is also transported to the job site in a separate holding tank 64. The holding tank 62 containing a reservoir of the non-activated cementitious slurry is connected to the suction connection of a pump 66 by a conduit 68 which includes a flow rate metering valve assembly 70 disposed therein. The discharge of the pump 66 is connected by a conduit 68 to an in-line mixer 70. The holding tank 64 containing a reservoir of set-activator solution is connected to the suction connection of a pump 72 by a conduit 74 having a flow rate metering valve assembly 76 disposed therein. The discharge connection of the pump 72 is connected to the in-line mixer 70 by a conduit 78. The outlet connection of the in-line mixer 70 is connected by a conduit 80 to the well head 84 of a well to be cemented and a cement slurry pump 82 is disposed in the conduit 80.

In operation of the system 60, the non-activated cementitious slurry and aqueous set-activator solution are simultaneously pumped into the in-line mixer 70 by the pumps 66 and 72 and associated conduits and metering valve assemblies, respectively. The metering valve assembly 70 in the conduit 68 and the metering valve assembly 76 in the conduit 74 regulate the flow rates of non-activated cementitious slurry and set-activator at predetermined levels whereby a set-activated cementitious slurry of this invention having the desired composition is produced in the in-line mixer 70. The resulting set-activated cementitious composition is pumped by the pump 82 into the well bore and subterranean zone to be cemented.

A preferred set-activated cementitious composition of this invention is comprised of water, particulate condensed silica fume comprised of particles having diameters less than about 1 micrometer and having an average particle diameter of about 0.1 micrometer suspended in said water in a weight ratio of condensed silica fume to water in the range of from about 1:2 to about 1.5:1, a dispersing agent comprised of the condensation polymer product of acetone, formaldehyde and sodium sulfite present in an amount sufficient to maintain the condensed silica fume particles in suspension, a set-activator comprised of calcium hydroxide present in the composition in an amount whereby the weight ratio of condensed silica fume to calcium hydroxide is in the range of from about 1:1.5 to about 3:1, and a set delaying additive comprised of calcium lignosulfonate present in the composition in an amount sufficient to delay the set of the composition until after it is placed in a zone to be cemented.

In the most preferred composition of this invention, the weight ratio of condensed silica fume to water in the composition is about 1:1, the weight ratio of condensed silica fume to calcium hydroxide activator in the composition is about 2:1, the above described condensation polymer dispersing agent is present in the composition in an amount of about 2.5% by weight of solids or the equivalent amount of about 3.5% by weight of water and the calcium lignosulfonate set delaying additive is present in the composition in an amount of about 0.6% by weight of the composition.

As indicated above, the methods of the present invention basically comprise cementing a subterranean zone penetrated by a well bore by first forming a pumpable cementitious composition comprised of water, particulate condensed silica fume, a dispersing agent, a set-activator and a set delaying additive as described above, pumping the resulting set-activated cementitious composition into the zone by way of the well bore and allowing the cementitious composition to set in the zone.

In a preferred method of this invention, the step of forming the pumpable set-activated cementitious composition comprises the steps of mixing a concentrated aqueous slurry of the particulate condensed silica fume with additional water and with aqueous solutions of the dispersing agent and set delaying additive to thereby form a pumpable non-activated cementitious slurry and combining an aqueous solution of calcium hydroxide activator with the non-activated cementitious slurry just prior to pumping the resulting set-activated cementitious slurry into the zone. The concentrated aqueous slurry of particulate condensed silica fume preferably has a weight ratio of condensed silica fume to water of about 1:1. The aqueous solution of the above described preferred dispersing agent preferably contains the dispersing agent in an amount of about 33% by weight of solution, and the aqueous solution of the above described preferred set delaying additive preferably contains the set delaying additive in an amount of about 40% by weight of the solution. The aqueous solution of calcium hydroxide activator preferably contains the activator in an amount of about 30% by weight of the solution.

In order to further illustrate the compositions and methods of this invention, the following examples are given.

EXAMPLE 1

A cementitious composition of this invention was prepared containing the following components and amounts.

| Component | Amount, parts by weight |
|---|---|
| Silica Fume | 300 |
| Water | 400 |
| Liquid Dispersing Agent[1] | 40 |
| Liquid Set Delaying Additive[2] | 13 |
| Calcium Hydroxide Activator (powder) | 300 |
| Total | 1053 |

[1] A 33% by weight aqueous solution of the condensation polymer product of acetone, formaldehyde and sodium sulfite.
[2] A 40% by weight aqueous solution of calcium lignosulfonate.

A test sample of the above composition was tested for 72 hour compressive strength at 80° F. in accordance with the *API specification for Materials and Testing for Well Cements*, API Specification 10A, 21st Edition dated Sept. 1, 1991, of the American Petroleum Institute, Washington, D.C. The result of the test was that the composition had a compressive strength of 1965 psi.

EXAMPLE 2

Another cementitious composition of this invention was prepared containing the following components and amounts.

| Component | Amount, parts by weight |
|---|---|
| Silica Fume | 300 |
| Water | 675 |
| Liquid Dispersing Agent[1] | 30.38 |
| Magnesium Oxide Activator (powder) | 10.13 |
| Calcium Hydroxide Activator (powder) | 150 |
| Total | 1165.51 |

[1] A 33% by weight aqueous solution of the condensation polymer product of acetone, formaldehyde and sodium sulfite.

Test samples of the above composition were tested for 24 hour and 72 hour compressive strengths at 80° F. and 24 hour compressive strength at 120° F. The results of these tests are

| Compressive Strength Tests | | |
|---|---|---|
| 80° F. | | 120° F. |
| 24 Hours | 72 Hours | 24 Hours |
| Not Set | 315 psi | 1000 psi |

EXAMPLE 3

Another composition of this invention was prepared containing the following components and amounts.

| Component | Amount, parts by weight |
|---|---|
| Silica Fume | 50 |
| Water | 217 |
| Dispersing Agent[1] | 4 |
| Water-Wetting Agent | 7 |
| Calcium Hydroxide Activator (powder) | 100 |
| Total | 378 |

[1] The condensation polymer product of acetone, formaldehyde and sodium sulfite.

A sample of the above composition was tested for 72 hours compressive strength at 80° F. The result of the test was 995 psi.

EXAMPLE 4

Another composition of this invention was prepared containing the following components and amounts.

| Component | Amount, parts by weight |
|---|---|
| Silica Fume | 50 |
| Water | 217 |
| Liquid Dispersing Agent[1] | 14.7 |
| Fluid Loss Additive | 5.5 |
| Calcium Hydroxide Activator (powder) | 100 |
| Total | 387.2 |

[1] A 33% by weight aqueous solution of the condensation polymer product of acetone, formaldehyde and sodium sulfite.

A sample of the above composition was tested for 72 hour compressive strength at 80 °F. The result of the test was 1215 psi.

EXAMPLE 5

Another composition of this invention was prepared containing the following components and amounts.

| Component | Amount, parts by weight |
|---|---|
| Silica Fume | 50 |
| Water | 50 |
| Dispersing Agent[1] | 2.5 |
| Triethyleneamine | 0.08 |
| Water-Wetting Agent | 0.04 |
| Calcium Hydroxide Activator (powder) | 25 |
| Total | 127.62 |

[1] The condensation polymer product of acetone, formaldehyde and sodium sulfite.

Test samples of the above composition were tested for 72 hour compressive strength at 80 °F. and at 120 °F. The results of the tests were 250 psi at 80° F. and 960 psi at 120° F.

EXAMPLE 6

Another composition of this invention was prepared containing the following components and amounts.

| Component | Amount, parts by weight |
|---|---|
| Silica Fume | 50 |
| Water | 50 |
| Liquid Dispersing Agent[1] | 82 |
| Liquid Thixotropic Additive | 1.4 |
| Calcium Hydroxide Activator (powder) | 25 |
| Total | 134.6 |

[1] A 33% by weight aqueous solution of the condensation polymer product of acetone, formaldehyde and sodium sulfite.

Test samples of the above composition were tested for 24 hour and 48 hour compressive strengths at 80 °F. and for 24 hour compressive strength at 95° F.

The results of the tests are given below.

| Compressive Strength Tests | | |
|---|---|---|
| 80° F. | | 95° F. |
| 24 Hours | 48 Hours | 24 Hours |
| 55 psi | 790 psi | 700 psi |

EXAMPLE 7

Another composition of this invention was prepared containing the following components and amounts.

| Component | Amount, parts by weight |
|---|---|
| Silica Fume | 50 |
| Water | 52 |
| Liquid Dispersing Agent[1] | 6.7 |
| Liquid Set Delaying Additive[2] | 2.2 |
| Calcium Hydroxide Activator (powder) | 25 |
| Total | 135.9 |

[1] A 33% by weight aqueous solution of the condensation polymer product of acetone, formaldehyde and sodium sulfite.
[2] A 40% by weight aqueous solution of calcium lignosulfonate.

Test samples of the above composition were tested for 24 hour, 48 hour, 3 day and 7 day compressive strengths at 80° F. and for 3 day and 7 day compressive strengths at 95° F.

The results of these tests are given below.

| Compressive Strength Tests | | | | | |
|---|---|---|---|---|---|
| 80° F. | | | | 95° F. | |
| 24 Hours | 48 Hours | 3 Days | 7 Days | 3 Days | 7 Days |
| Soft set | 60 psi | 370 psi | 1395 psi | 1770 psi | 1970 psi |

EXAMPLE 8

Another composition of this invention was prepared containing the following components and amounts.

| Component | Amount, parts by weight |
|---|---|
| Silica Fume | 50 |
| Water | 57.5 |
| Liquid Dispersing Agent[1] | 6.7 |
| Calcium Hydroxide Activator (powder) | 25 |
| Liquid Set Delaying Additive[2] | 2.2 |
| Calcium Chloride | 2 |
| Total | 143.4 |

[1] A 33% by weight aqueous solution of the condensation polymer product of acetone, formaldehyde and sodium sulfite.
[2] A 40% by weight aqueous solution of calcium lignosulfonate.

Test samples of the above composition were tested for 24 hour, 48 hour, 3 day and 7 day compressive strengths at 80° F. and for 3 day and 7 day compressive strengths at 95° F.

The results of these tests are given below.

| Compressive Strength Tests | | | | | |
|---|---|---|---|---|---|
| 80° F. | | | | 95° F. | |
| 24 Hours | 48 Hours | 3 Days | 7 Days | 3 Days | 7 Days |
| Not set | Not set | 190 psi | 1325 psi | 1310 psi | 3230 psi |

EXAMPLE 9

Another composition of this invention was prepared containing the following components and amounts.

| Component | Amount, parts by weight |
|---|---|
| Silica Fume | 50 |
| Water | 66.7 |
| Liquid Dispersing Agent[1] | 6.7 |
| Calcium Hydroxide Activator (powder) | 25 |
| Total | 148.4 |

[1] A 33% by weight aqueous solution of the condensation polymer of acetone, formaldehyde and sodium sulfite.

Test samples of the above composition were tested for 3 day compressive strength at 80° F. and 24 hour compressive strength at 95° F.

The results of these tests are given below.

| Compressive Strength Tests | |
|---|---|
| 80° F. | 95° F. |
| 3 Days | 24 Hours |
| 690 psi | 280 psi |

EXAMPLE 10

Another composition of this invention was prepared containing the following components and amounts.

| Component | Amount, parts by weight |
|---|---|
| Silica Fume | 50 |
| Water | 51.7 |
| Liquid Dispersing Agent[1] | 6.7 |
| Calcium Hydroxide Activator (powder) | 1.7 |
| Total | 110.1 |

[1] A 33% by weight aqueous solution of the condensation polymer product of acetone, formaldehyde and sodium sulfite.

Test samples of the above composition were tested for 24 hour, 48 hour, 3 day and 7 day compressive strengths at 140° F.

The results of these tests are given below.

| Compressive Strength Tests 140° F. | | | |
|---|---|---|---|
| 24 Hours | 48 Hours | 3 Days | 7 Days |
| 670 psi | 995 psi | 2440 psi | 2645 psi |

From the above examples it can be seen that the cementitious compositions of this invention have good compressive strengths and are suitable for use in well cementing operations.

The present invention is, therefore, well adapted to carry out the objects and attain the ends and advantages mentioned as well as those which are inherent therein. While numerous changes may be made by those skilled in the art, such changes are encompassed within the spirit of this invention as defined by the appended claims.

What is claimed is:

1. A method of cementing a subterranean zone penetrated by a well bore comprising the steps of:

forming a pumpable cementitious composition consisting essentially of water, particulate condensed silica fume consists essentially of particles having diameters less than about 1 micrometer suspended in said water in a weight ratio of condensed silica fume to water in the range of from about 1:2 to about 1.5:1, a dispersing agent for facilitating the dispersal of said silica fume particles in said water and maintaining said particles in suspension therein, a set-activator selected from calcium hydroxide, magnesium oxide, or mixtures thereof, and a set delaying additive for increasing the time in which said composition sets after said set-activator is combined therewith;

pumping said cementitious composition into said zone by way of said well bore; and allowing said cementitious composition to set in said zone.

2. The method of claim 1 wherein said dispersing agent is comprised of the condensation polymer product of an aliphatic ketone, an aliphatic aldehyde and a compound which introduces acid groups into the condensation polymer.

3. The method of claim 1 wherein said dispersing agent is comprised of the condensation polymer product of acetone, formaldehyde and sodium sulfite, and is present in said composition in an amount of about 3.5% by weight of water in said composition.

4. The method of claim 3 wherein said set delaying agent is comprised of a lignosulfonate salt present in said composition in an amount of about 0.6% by weight of said composition.

5. The method of claim 4 where said set activator is calcium hydroxide present in said composition in an amount whereby the weight ratio of condensed silica fume to calcium hydroxide is in the range of from about 1:1.5 to about 3:1.

6. The method of claim 5 wherein the step of forming said pumpable cementitious composition comprises:

mixing a concentrated aqueous slurry of said particulate condensed silica fume with additional water and with preformed aqueous solutions of said dispersing agent and said set delaying additive to thereby form a pumpable non-activated cementitious slurry; and combining an aqueous solution of said calcium hydroxide activator with said non-activated cementitious slurry just prior to pumping the resulting activated cementitious slurry into said zone.

7. The method of claim 6 wherein said concentrated aqueous slurry of particulate condensed silica fume has a weight ratio of silica fume solids to water of about 1:1.

8. The method of claim 7 wherein said aqueous solution of said dispersing agent contains said dispersing agent in an amount of about 33% by weight of said solution.

9. The method of claim 8 wherein said aqueous solution of said set delaying additive contains said set delaying additive in an amount of about 40% by weight of said solution.

10. The method of claim 9 wherein said aqueous solution of said calcium hydroxide activator contains said activator in an amount of about 30% by weight of said solution.

11. The method of claim 10 wherein said non-activated cementitious slurry is premixed at a location remote from the location of said well bore.

12. The method of claim 10 wherein said non-activated cementitious slurry is mixed at the location of said well bore.

* * * * *